United States Patent
Manepalli et al.

(10) Patent No.: US 12,538,292 B2
(45) Date of Patent: Jan. 27, 2026

(54) RECEIVE (RX) RATE CONTROL FOR THREAD COEXISTENCE WITH OTHER RADIOS

(71) Applicant: Apple Inc., Cupertino, CA (US)

(72) Inventors: Venkateswara Rao Manepalli, San Jose, CA (US); Yaranama Venkata Ramana Dass, Belmont, CA (US); Sarvesh Kumar Varatharajan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 17/889,095

(22) Filed: Aug. 16, 2022

(65) Prior Publication Data

US 2023/0105762 A1    Apr. 6, 2023

Related U.S. Application Data

(60) Provisional application No. 63/247,990, filed on Sep. 24, 2021.

(51) Int. Cl.
*H04W 72/12* (2023.01)
*H04W 72/14* (2009.01)
*H04W 72/23* (2023.01)

(52) U.S. Cl.
CPC ....... *H04W 72/1215* (2013.01); *H04W 72/23* (2023.01)

(58) Field of Classification Search
CPC ............ H04W 72/1215; H04W 72/23; H04W 72/231; H04W 72/232; H04W 72/20; H04W 88/06; H04W 88/04; H04W 88/022; H04W 28/02; H04W 28/08; H04W 28/12
See application file for complete search history.

(56) References Cited

U.S. PATENT DOCUMENTS

| | | | |
|---|---|---|---|
| 9,893,744 B1* | 2/2018 | Patel | H04W 76/16 |
| 2018/0335928 A1* | 11/2018 | Van Os | G06Q 20/204 |
| 2019/0180403 A1* | 6/2019 | Jiwani | G06Q 10/02 |
| 2020/0119864 A1* | 4/2020 | Xu | H04L 1/1858 |
| 2022/0103201 A1* | 3/2022 | Maggio | H04L 25/4906 |
| 2022/0394347 A1* | 12/2022 | Cheong | H04B 7/02 |

* cited by examiner

*Primary Examiner* — Phong La
(74) *Attorney, Agent, or Firm* — STERNE, KESSLER, GOLDSTEIN & FOX P.L.L.C.

(57) ABSTRACT

An approach is described for a wireless device comprising a transceiver and a processor communicatively coupled to the transceiver. In a thread-based device, a thread radio coexists with a primary radio, such as a Bluetooth or WiFi radio. Because both radio share a common frequency band, the thread radio requests grants from the primary radio for transmission and reception. So as to avoid bogging down the primary radio, the thread radio throttles its requests. Specifically, the thread radio tracks certain variables indicative of the number of requests that have been made within a time window and the types of requests that have been made to the primary radio. By limiting the number of total requests and the number of requests of each type within the time window, the thread radio avoids overburdening the primary radio.

20 Claims, 8 Drawing Sheets

RECEIVE (RX) RATE CONTROL FOR THREAD COEXISTENCE WITH OTHER RADIOS

CROSS REFERENCE TO RELATED APPLICATIONS

This application claims the benefit of U.S. Provisional Application No. 63/247,990 filed on Sep. 24, 2021, which is hereby incorporated by reference in its entirety.

BACKGROUND

Field

The described aspects generally relate to an enhancement thread radios and devices with thread radios.

Related Art

A wireless network such as an internet of things (IoT) network may include a massive number of devices, such as sensors, actuators, wearable devices, security appliances, smart home devices, etc. Thread network technology improves the wireless network by connecting the devices in the wireless network, such as IoT devices, with robust and energy-efficient communication links.

SUMMARY

Some aspects of this disclosure relate to apparatuses and methods for implementing an enhancement on thread-capable devices. For example, systems and methods are provided for implementing frequency band sharing, and more particularly reception grant rate control for thread radios, in thread network devices.

According to aspects of the disclosure, a wireless device is disclosed that includes a primary radio, having a primary radio driver, and configured to communicate with a network; a secondary radio, having a secondary radio driver, and configured to communicate with the network; and an inter-radio interface, coupled to the primary radio driver and the secondary radio driver, configured to provide inter-communication between the primary radio and the secondary radio, wherein the secondary radio driver includes one or more processors configured to: transmit a grant request and a grant type to the primary radio via the inter-radio interface; receive a grant message from the primary radio via the inter-radio interface that either grants or denies the grant request; and in response to the received grant message granting the grant request, transmit a signal to a network.

According to aspects of the disclosure, the inter-radio interface is a three-wire interface.

According to aspects of the disclosure, the grant request is transmitted on a first wire of the inter-radio interface, the grant type is transmitted on a second wire of the radio interface, and the grant message is received on a third wire of the radio interface.

According to aspects of the disclosure, the one or more processors are further configured to receive the grant message on the third wire a predetermined amount of time after the transmitting of the grant request.

According to aspects of the disclosure, the one or more processors are further configured to receive the grant message a predetermined amount of time after the transmitting of the grant request.

According to aspects of the disclosure, the grant request is a flag or a predetermined voltage, and the grant type is a flag or a predetermined voltage.

According to aspects of the disclosure, the one or more processors are further configured to withhold transmission to the network in response to the received grant message denying the grant request.

According to aspects of the disclosure, a method for throttling signal transmissions by a secondary radio is disclosed that includes sending, by the secondary radio, a grant request and a grant type to a primary radio; receiving, in response to the sending, a grant message from the primary radio that indicates whether the grant request is authorized or denied; and transmitting or withholding transmission of a signal to a network based on the received grant message.

According to aspects of the disclosure, the grant request and the grant type are transmitted sequentially.

According to aspects of the disclosure, the grant request and the grant type are sent on different wires.

According to aspects of the disclosure, the grant message is received from a grant message wire a predetermined amount of time after the sending.

According to aspects of the disclosure, each of the grant request and the grant type is a flag or a predetermined voltage.

According to aspects of the disclosure, a method for throttling signal receptions of a secondary radio, from a network, in a wireless device that includes a primary radio is disclosed that includes starting a window timer; receiving a message from the network; incrementing a message count; determining whether a first type of grant request or a second type of grant request is available; and in response to one of the first grant request or the second grant request being available, processing the received message.

According to aspects of the disclosure, the determining includes determining whether the second type of grant request is available only in response to the first type of grant request not being available.

According to aspects of the disclosure, the method further includes transmitting an acknowledgement signal to an originating device of the received message in response to the processing of the received message.

According to aspects of the disclosure, the method further includes selecting one of the first type of grant request or the second type of grant request based on the determining.

According to aspects of the disclosure, the method further includes in response to selecting the first type of grant request, requesting a reception grant from the primary radio; and transmitting an acknowledgement signal to an originating device only in response to the reception grant being authorized by the primary radio.

According to aspects of the disclosure, the method further includes in response to selecting the second type of grant request, requesting a reception grant from the primary radio; and transmitting an acknowledgement signal to an originating device without waiting for a response from the primary radio and without deference to the response from the primary radio.

According to aspects of the disclosure, the method further includes dropping the received message in response to neither the first type of grant request nor the second type of grant request being available.

According to aspects of the disclosure, the method further includes resetting at least one of the message count and the window timer in response to either the window timer expiring or the count reaching a predetermined maximum.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
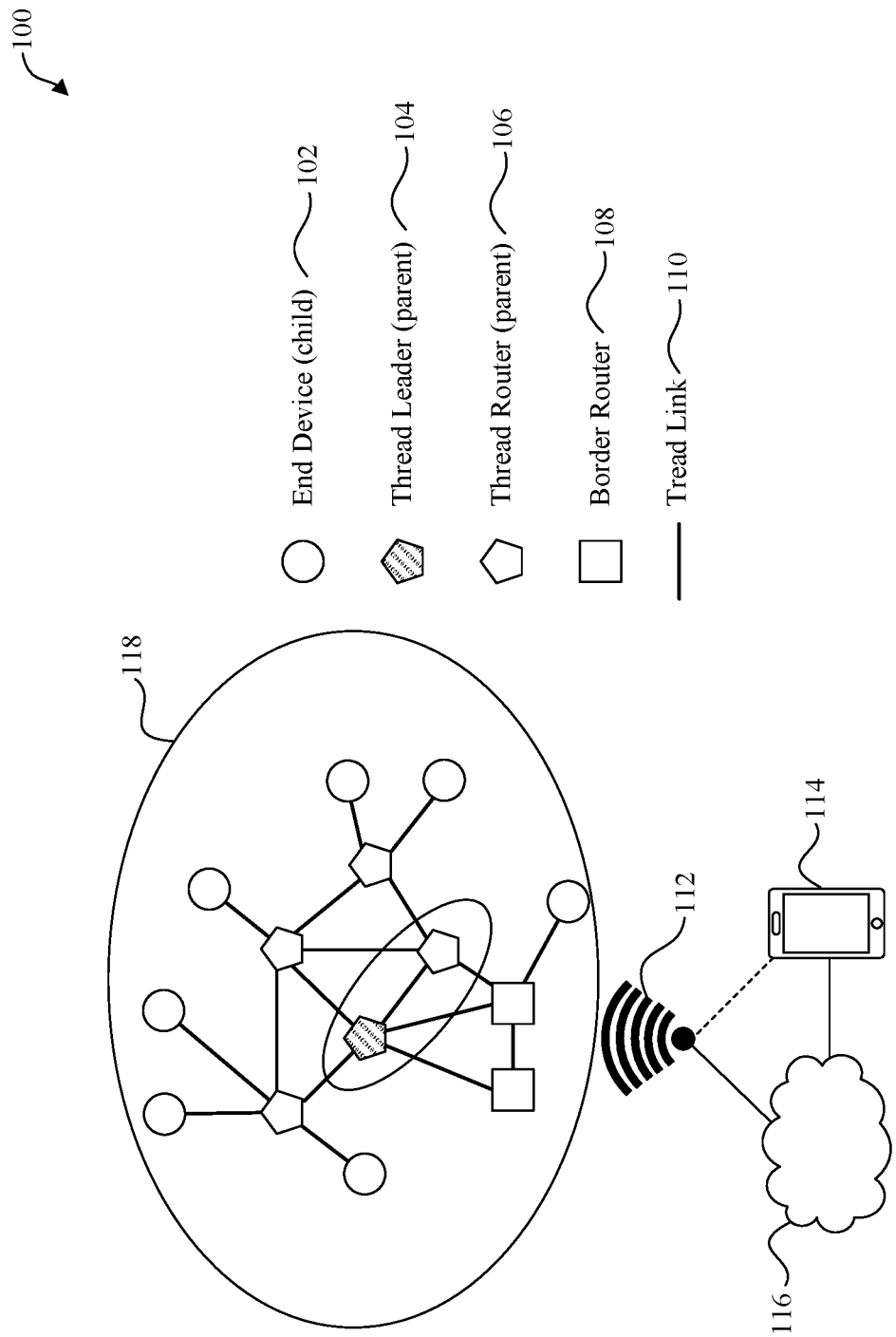
FIG. 1 illustrates an example system implementing a communication network including a thread network, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing enhancements of a thread network. For example, systems and methods are provided for implementing MLE advertisement repetition in the Thread network.

FIG. 1 illustrates an exemplary system 100 implementing a communication network including a thread network 118, according to some aspects of the disclosure. Example system 100 is provided for the purpose of illustration only and does not limit the disclosed aspects. System 100 may include, but is not limited to, an access point 112, a user equipment (UE) 114, an internet 116, and the thread network 118 including one or more end devices 102, a thread leader device 104, one or more thread routers 106, and one or more border routers 108. The Thread border router mainly acts as a gateway or bridge connecting the Thread network with IP based external connectivity over WiFi or Ethernet. Other devices in the thread network 118 are connected via thread links 110. The devices in the thread network 118, such as the one or more end devices 102, the thread leader device 104, the one or more thread routers 106, may include electronic devices configured to operate using one or more institute of electrical and electronics engineers (IEEE) 802.15 standards, such as IEEE 802.15.4 standard supporting ZigBee and Z-Wave, IEEE 802.15.1 standard supporting Bluetooth, etc. The electronic devices may also be configured to operate using other wireless standards, such as IEEE 802.11. The electronic devices may include, but are not limited to, wireless communication devices, home entertainment devices, smartphones, laptops, desktops, tablets, personal assistants, monitors, televisions, wearable devices, Internet of Things (IoT) devices, vehicle communication devices, and the like.

According to some aspects, an end device 102 communicates primarily with a thread router 106. For example, the end device 102 directly transmits packets to and receives packets from the thread router 106. The end device 102 communicates with other devices in the thread network 118 or devices outside the thread network 118 via the thread router 106. In some aspects, the end device 102 is a low power device. The end device 102 may disable its transmission and receiving to reduce power consumption.

According to some aspects, the thread router 106 forwards packets for other devices in the thread network 118. For example, the thread router 106 receives a packet from the end device 102 and forwards the packet to a second end device 102 or a second thread router 106. The thread router 106 keeps its transmission and receiving enabled at all times.

According to some aspects, a thread leader device 104 also forwards packets for other devices in the thread network 118 in a similar way as the thread router 106 as described above. For example, the thread leader device 104 receives a packet from the thread router 106 and forwards the packet to the second thread router 106. In some aspects, the thread leader device 104 manages a set of one or more thread routers 106 in the thread network 118. In some aspects, the thread leader device 104 is elected by a selection process. For example, during the selection process, one or more partitions can be formed, with each having its own leader. In this scenario, the thread router 106 may be promoted to be a thread leader device 104. In some embodiments, these different partitions will eventually merge depending on a defined set of rules.

According to some aspects, a border router 108 connects thread devices in the thread network 118 and devices outside the thread network 112. For example, the border router 108 receives a packet from a thread router 106 and forwards the packet to the access point 112. For another example, the border router 108 receives a second packet from the access point 112 and forwards the packet to the thread router 106.

According to some aspects, the access point 112 may include electronic devices configured to operate based on a wide variety of wireless communication techniques such as, but are not limited to, techniques based on IEEE 802.11 standard, IEEE 802.15 standard, and one or more 3GPP standards, such as Release 15 (Rel-15), Release 16 (Rel-16), or Release 17 (Rel-17) or other 3GPP releases. The access point 112 may include, but is not limited to, a router device, a base station, and a mobile base station. The UE 105 may include an electronic device configured to operate using IEEE 802.11 standard, IEEE 802.15 standard, and/or one or more 3GPP releases, such as Release 15 (Rel-15), Release 16 (Rel-16), Release 17 (Rel-17), or other 3GPP releases. The UE 105 may include, but is not limited to, wireless communication devices, smartphones, laptops, desktops, tablets, personal assistants, monitors, televisions, wearable devices, Internet of Things (IoT) devices, vehicle communication devices, and the like. In some aspects, the access point 112 directly connects to the internet 116. The UE 114 may connect to the internet 116 directly or indirectly via the access point 112.

Some end devices 114 are capable of communicating using not only thread protocols, but also other protocols, such as WiFi or Bluetooth®. However, many of those communication protocols utilize overlapping frequencies within the 2.4 GHz frequency band. For example, thread utilizes 16 channels, each spaced 5 MHz apart, dispersed between 2.4 GHz and 2.4835 GHz. Meanwhile, IEEE 802.11b (both North American and European) includes three 22 MHz-wide channels within the same frequency band. As a result, there is significant overlap with the thread channels, which can cause undesired interference between these different radios. Previous solutions to this problem allocate predetermined time slices to each of the different radios. However, this is highly inefficient as slices may be designated when a particular radio does not have any need for one. Therefore, aspects of the present disclosure provide an on-demand system for request transmission and reception grants from a secondary radio (e.g., a thread radio) to a primary radio (e.g., a WiFi radio). This and other aspects will be discussed in further detail below.

Figure 2A:
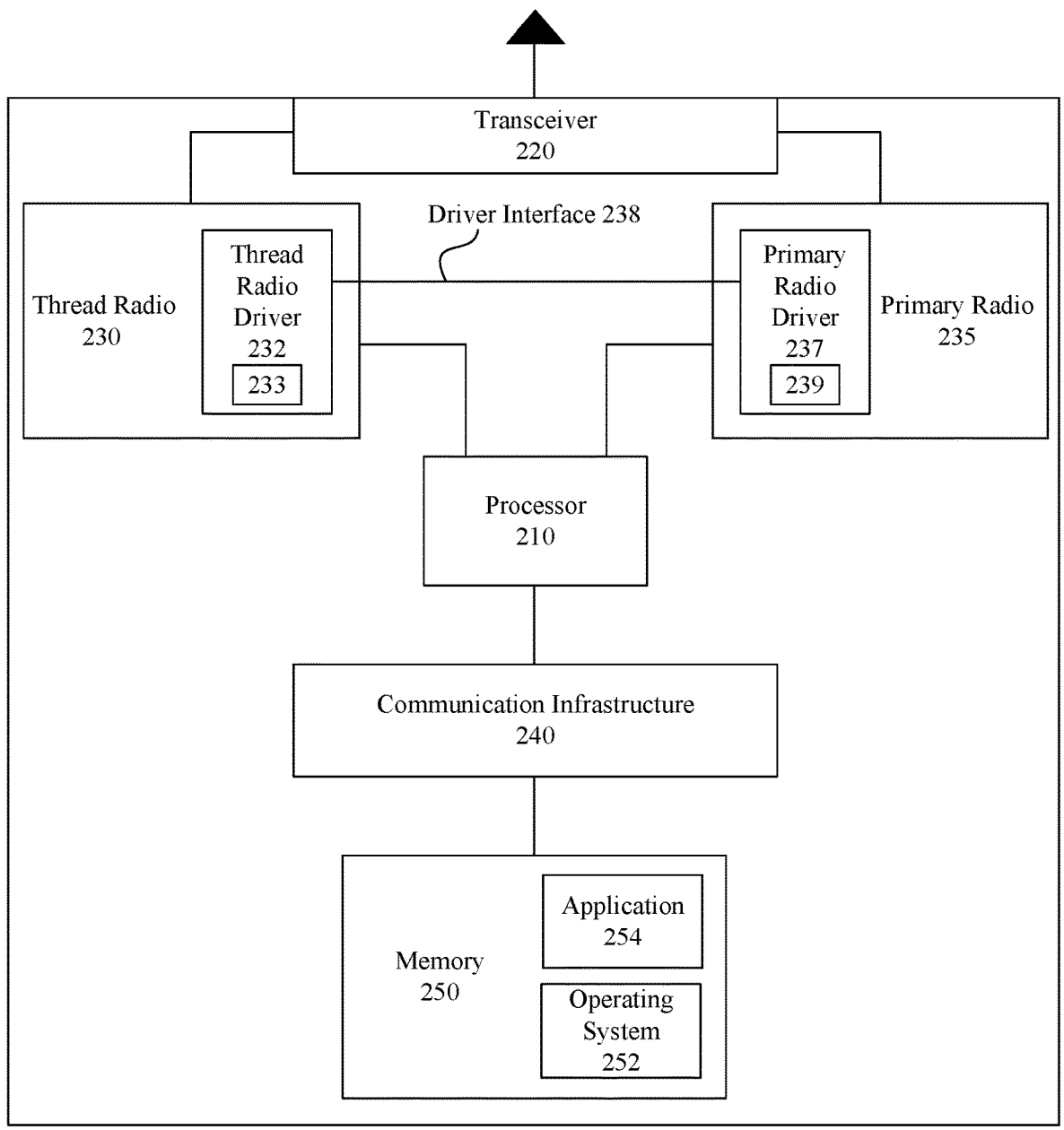
FIG. 2A illustrates a block diagram of an example system of an electronic device for the communication network, according to some aspects of the disclosure.

FIG. 2A illustrates a block diagram of an example system 200 of an electronic device implementing mechanisms for a thread network, according to some aspects of the disclosure. The system 200 may be an example of an end device 102 of the thread network 118 of the system 100. System 200 includes a processor 210, one or more transceivers 220, a communication infrastructure 240, a memory 250, an operating system 252, an application 254, and one or more antennas 260. The exemplary system 200 also includes a primary radio 235 having a primary radio driver 237 and includes a thread radio 230 that has a thread radio driver 232. Herein, the thread radio 230 can also be referred to as a secondary radio having a secondary radio driver. The primary radio may be one of WiFi, Bluetooth®, or other radios that communicate within the 2.4 GHz frequency band according to various aspects of the disclosure. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, Apple TV™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus. The processor 210, alone, or together with instructions stored in the memory 250 performs operations enabling system 200 of the thread network 118 of the system 100 to implement multi-radio coexistence mechanisms and RX grant request rate control, as described herein.

The one or more transceivers 220 transmit and receive communications signals based on the multi-radio coexistence and RX grant request rate control mechanisms. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, amplifiers, filters, buffers, drivers and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

According to some aspects of this disclosure, the processor 210, alone or in combination with computer instructions stored within the memory 250, and/or the primary radio driver 237 and thread radio driver 232, implements the methods and mechanisms discussed in this disclosure. For example, the processor 210, alone or in combination with computer instructions stored within the memory 250, and/or the radio drivers 232 and 237, implements mechanisms for multi-radio coexistence and reception grant request rate control. According to some aspects of this disclosure, the processor 210, alone or in combination with computer instructions stored within the memory 250, causes the primary radio 235 and thread radio 230 to coordinate transmission and reception by the thread radio 230. The processor 210, alone or in combination with computer instructions stored within the memory 250, causes the thread radio driver 232 to send grant requests to the primary radio driver 237 and causes the primary radio driver 237 to assess whether to grant the request and to issue grant replies to the thread radio driver 232. For example, when the thread radio 230 seeks to transmit, the thread radio driver 232 sends a transmission grant request to the primary radio driver 237. According to aspects of the disclosure, each of the radio drivers includes a processor for carrying out the inter-radio communication. For example, thread radio driver 232 includes processor 233 and primary radio driver includes processor 239. In response to receiving the grant request from the thread driver 232, the primary radio driver 237 determines whether to allow or deny the grant request and issues a reply message to the thread radio driver 232. Based on the response, the thread radio 230 either proceeds to transmit, or cancels the transmission. This coexistence mechanism can also be implemented during reception by the thread radio 230. Specifically, when the thread radio 230 detects an incoming signal, the thread radio driver 232 and/or the processor 210 first performs reception grant request rate control. In particular, the primary radio driver 237 is configured to always grant a reception grant request. Therefore, it is incumbent upon the thread radio driver 232 and/or processor 210 to limit such requests. This rate control will be described in further detail below. Based on the result of the rate control, the thread radio driver 232 sends a reception grant request to the primary radio driver 237. The primary radio driver 237 will issue the grant, after which the thread radio 230 will process the received signal.

As described above, the primary radio driver 237 handles coexistence management by receiving and processing grant requests from the thread radio 230. However, in other aspects, the coexistence management responsibilities are handled by other elements, such as processor 210 outside of the radios, or a standalone coexistence management unit. In these aspects, the coexistence management functionalities are substantially the same as described above with respect to the primary radio driver 237 for purposes of analyzing and determining whether to grant the grant requests from the thread radio.

As discussed in more detail below with respect to FIGS. 2A-5, processor 210 and/or radio drivers 232 and 235 may implement the mechanisms for radio coexistence and reception grant request rate control, as discussed with respect to the system 100 of FIG. 1.

Figure 2B:
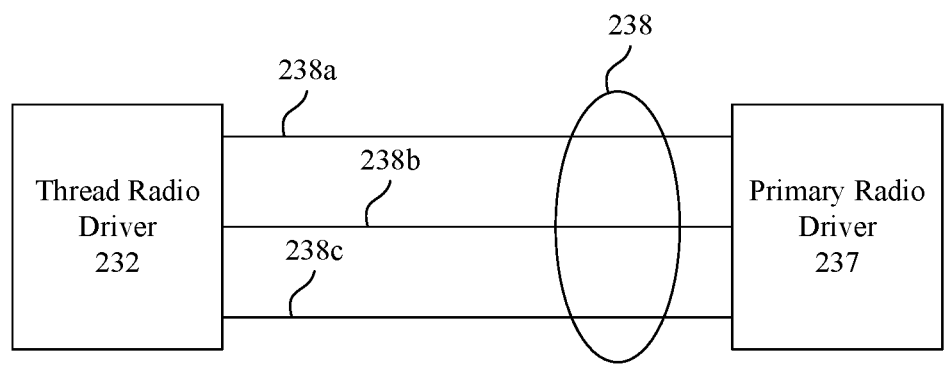
FIG. 2B illustrates a block diagram of an exemplary inter-radio interface according to aspects of the disclosure.

As discussed above, it is very inefficient and costly to implement predetermined time slices to the different radios. Therefore, the system 200 operates to coordinate between the different radios. FIG. 2B is a block diagram of an exemplary inter-radio interface (also referred to herein as a "driver interface") according to aspects of the disclosure. As shown in FIG. 2B, the primary radio driver 237 and the thread radio driver 232 communicate with each other over a driver interface 238. According to aspects of the disclosure, this interface is a three-wire coaxial interface.

When the thread radio 230 seeks to transmit signals to the environment, the thread radio driver 232 sends a grant request message over the driver interface 238 to the primary radio driver 237 using a first wire 238a of the three-wire interface. According to aspects of the disclosure, the grant request message is a flag or predefined voltage on the wire 238a. At the same time, or shortly thereafter, the thread radio driver 232 sends a request type message on the second wire 238b of the coaxial interface 238. The request type message indicates whether the request is for a transmission grant or a reception grant. According to aspects of the disclosure, the request type message is also a flag or one of two predefined voltage levels (e.g., HIGH or LOW).

The primary radio driver 237 detects a change in state on the first wire 238a, indicative of a pending grant request. As a result of that change in state, the primary radio driver 237 pulls the request type from the second wire 238b. When the request type indicates that the grant request is for reception, the primary radio driver 237 automatically grants the request. As a result, primary radio driver 237 sends a grant approval message on the third wire 238c to the thread radio driver 232. According to aspects of the disclosure, the grant approval message is a flag or predetermined voltage on the third wire 238c. The thread radio driver 232 is configured to automatically pull the state off of the third wire 238c a predetermined amount of time after sending the grant request to the primary radio driver 237. This allows the thread radio driver 232 to acquire the correct approval message without having to detect a change in state on the wire 238c. Alternatively, the primary radio driver 237 can be configured to set a voltage on the wire 238c to a predefined reset voltage before setting the approval message on the line. In this fashion, the thread radio driver 232 can detect the change in state (e.g., predefined reset voltage), and then pull approval message off the line 238c.

Figure 3:
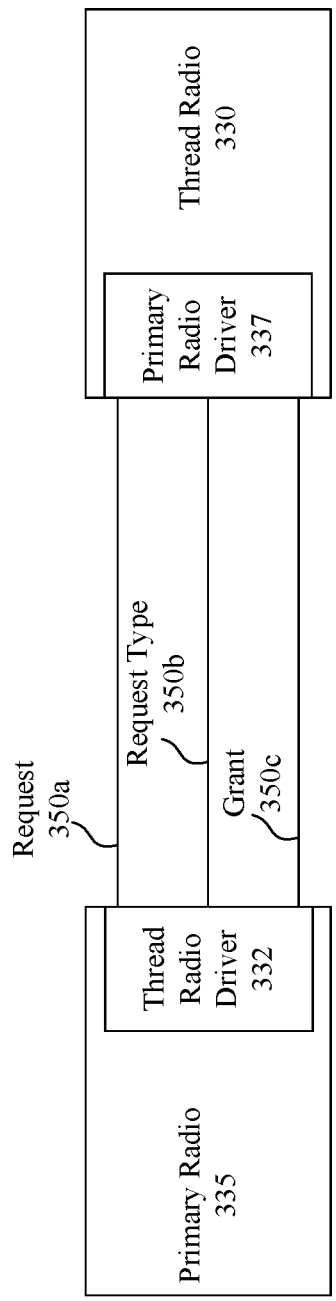
FIG. 3 illustrates an exemplary radio configuration according to aspects of the disclosure.

FIG. 3 illustrates an exemplary radio configuration 300 according to aspects of the disclosure. As shown in FIG. 3, a thread radio 330 includes a thread radio driver 332 and a primary radio 335 includes a primary radio driver 337. The thread radio driver 332 and the primary radio driver 337 are connected to each other via an interface 350. According to aspects of the disclosure, the interface 350 is a 3-wire interface, with each wire having a designated signaling. However, other suitable interfaces are also capable of satisfying the message exchange functionality of the present disclosure. In the example of FIG. 3, wire 350a is a request wire that carries a request signal, wire 350b is a request type wire that carries a request type signal, and wire 350c is a grant wire that carries a grant signal.

As discussed above, when the thread radio 330 desires to receive a signal form the environment, the thread radio 330 issues a reception grant request to the primary radio 335. In other words, the thread radio driver 332 places a signal on the request line 350a indicating a pending request, and places a signal on the request type line 350b indicating that the request is a reception request. Meanwhile, the primary radio driver 337 detects the change of state on the request line 350a. In response to detecting the change in state, the primary radio driver 337 pulls the signal from the request type line 350b. In this example, the primary radio 335 identifies the request type as a reception request. According to aspects of the disclosure, the primary radio 335 is configured to prioritize reception requests, and thus automatically grants the request. Therefore, the primary radio driver 337 loads the grant line 350c with a grant message (as opposed to a denial message). According to aspects of the disclosure, this message is loaded onto the grant wire 350c within a predetermined time of detecting the change of state on the request wire 350a.

The thread radio driver 332 waits a predetermined amount of time from when it loaded the request on the request wire 350a. When this predetermined amount of time expires, the thread radio driver 332 pulls a state from the grant wire 350c. According to aspects of the disclosure, the predetermined wait time and the predetermined grant time are the same. In the present example, the state indicates that the request is granted. Thus, the thread driver 332 causes the thread radio 330 to receive and process the signal.

Figure 4:
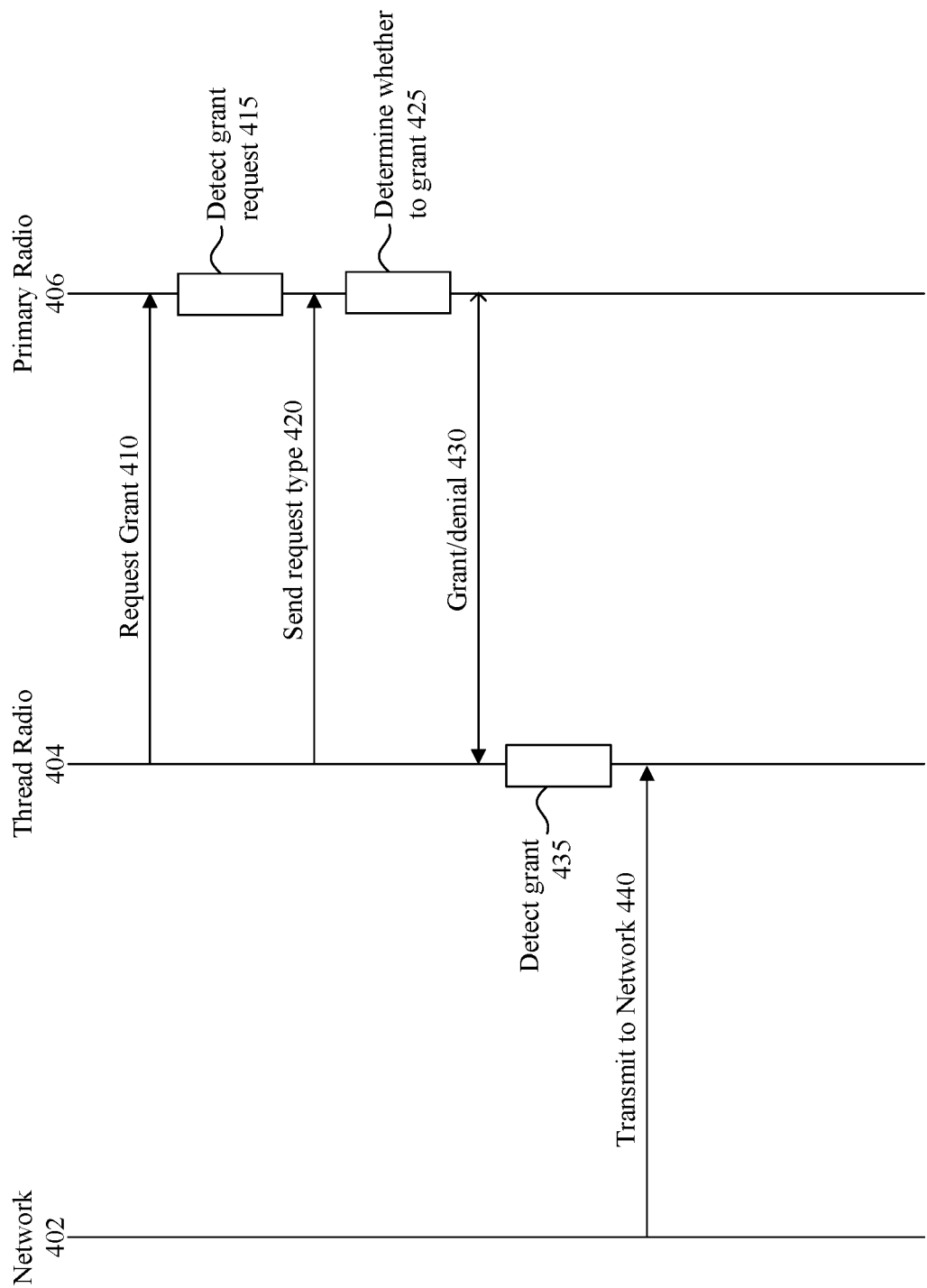
FIG. 4 illustrates a message flow diagram illustrating messages exchanged between a network, a transmitting thread radio, and a primary radio, according aspects of the disclosure.

FIG. 4 is a message-flow diagram illustrating the messages exchanged between the network 402, a transmitting thread radio 404, and the primary radio 406. As shown in FIG. 4, the thread radio 404 desires to transmit a message to the network 402. Thus, the thread radio 404 sends a grant request message 410 to the primary radio 406. The primary radio 406 detects the grant request at 415. Meanwhile, the thread radio 404 also sends a request type message 420 to the primary radio 406. The primary radio 406 checks the request type, and makes a determination of whether to grant the request at 425.

Once the primary radio completes its grant determination, it sends a grant or denial message 430 to the thread radio 404. The thread radio 404 detects the grant/denial message at 435, which indicates whether the request to transmit was granted or denied. If denied, the process concludes and the thread radio does not transmit the signal. However, as illustrated in FIG. 4, if the request is granted, the thread radio 404 transmits a signal transmission message 440 to the network 402.

Figure 5:
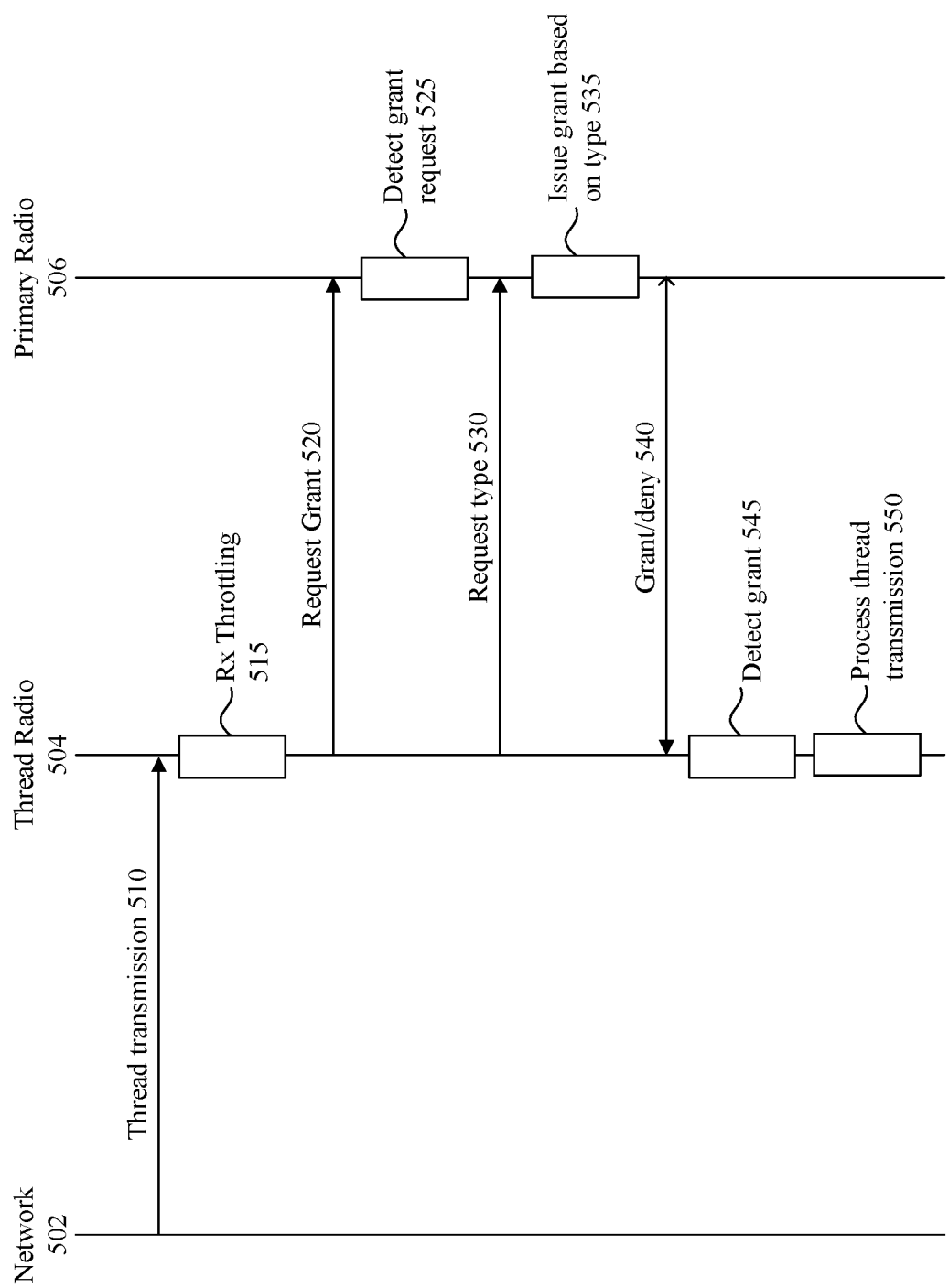
FIG. 5 illustrates a message flow diagram during reception of a thread message by a thread radio according to aspects of the disclosure.

FIG. 5 illustrates a message flow diagram demonstrating the exchange of messages between a network 502, a thread radio 504, and a primary radio 506. As shown in FIG. 5, the message flow begins with the thread radio 504 receiving an incoming transmission 510 from the network 502. Upon reception, the thread radio carries out a reception grant throttling process 515 in order to determine whether to request a reception grant from the primary radio 506. This throttling process is described in further detail below, with respect to FIG. 6.

In the example illustrated in FIG. 5, the result of the reception grant throttling process 515 is a determination to request a reception grant from the primary radio 506. Thus, the thread radio 504 sends a request grant message 520 to the primary radio 506. The primary radio detects the grant request at 525. Meanwhile, the thread radio 504 also sends a request type message 530 that indicates the type of grant being made. In response to the detecting 525, the primary radio 506 then determines whether the issue the grant based on the request type at 535.

According to aspects of the disclosure, the primary radio 506 is configured to prioritize reception requests. Therefore, in response to detecting that the request type is for a reception grant, the primary radio 506 automatically determines to grant the request. Therefore, in response to the grant determination 535, the primary radio 506 sends a grant message 540 to the thread radio 504. The thread radio detects the message at 545 and then processes the received message at 550.

Figure 6:
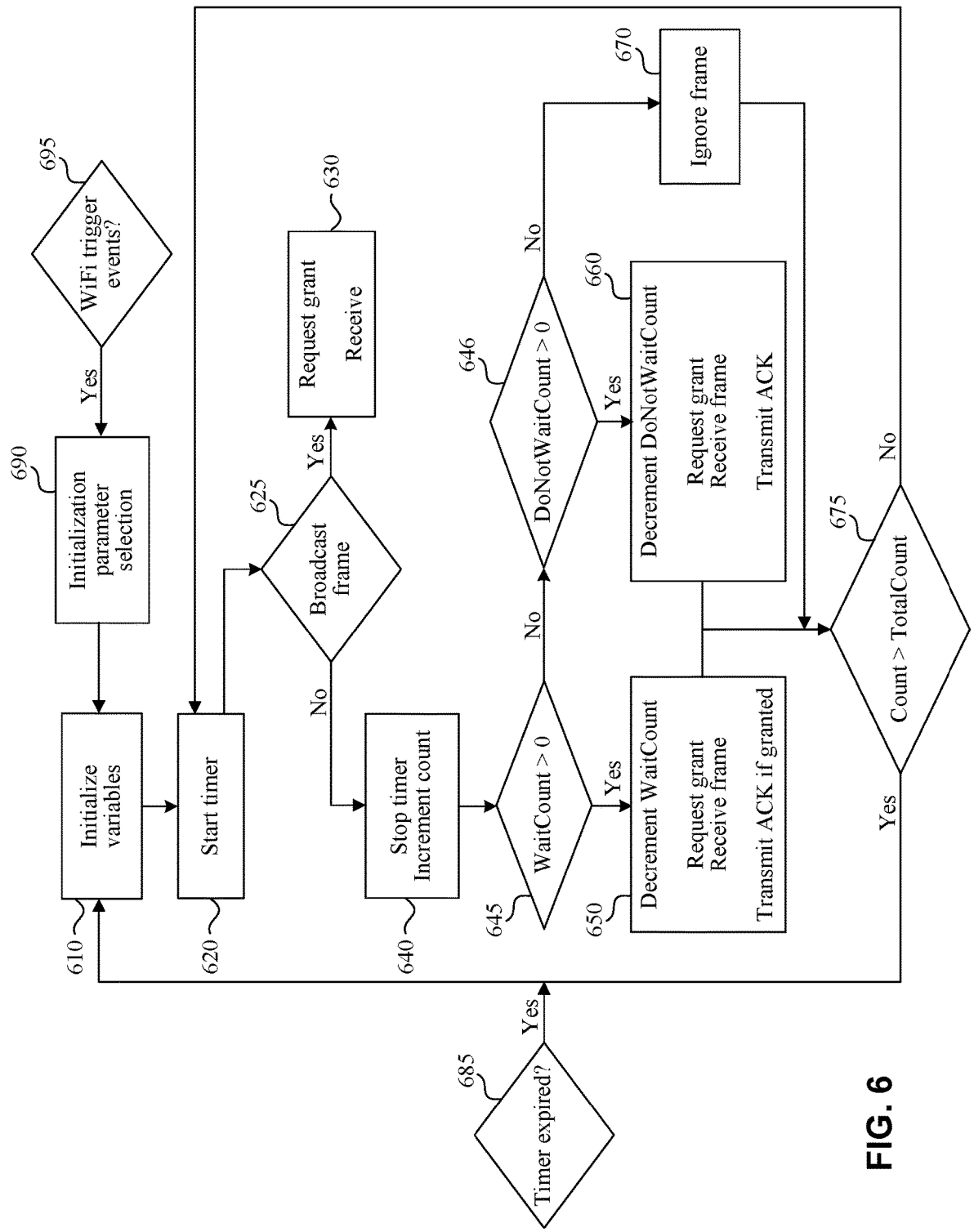
FIG. 6 illustrates a flowchart diagram of an exemplary method for reception grant request throttling according to aspects of the disclosure.

FIG. 6 illustrates a flowchart diagram of an exemplary method 600 for reception grant request throttling according to aspects of the disclosure. As discussed above, because the primary radio prioritizes reception grant requests, it is configured to always grant those requests. As a result, making too many reception grant requests will bog down the primary radio, and possibly delay or prevent it from processing its own messages. This is highly undesirable. Therefore, the thread radio throttles its own reception grant requests so as to mitigate their impact on primary radio.

The method 600 includes three different scenarios for processing received messages. In a first scenario (e.g., standard reception), the Thread radio waits for a grant from the primary radio before transmitting an acknowledgement signal (e.g., ACK) to the transmitting device. In a second scenario (e.g., prioritized reception), the Thread radio does not submit a grant request to the primary radio, but rather simply transmits the ACK without any grant. Finally, in a third scenario (low-priority/broadcast reception), the Thread radio does not request a grant and does not transmit the ACK.

In step 610, variables are initialized for each of these different scenarios. According to aspects of the disclosure, this includes setting a total count, and count values associated with each of the different scenarios (e.g., WaitForGrantCount, DoNotWaitForGrantCount, and currentTotalCount) to a predetermined value—e.g., 0.

In step 620, the timer is started for the current window. In step 625, a determination is made as to whether a received signal frame is a broadcast frame. If the frame is a broadcast frame (625-Y), then the thread radio requests a grant from the primary radio at 630 and proceeds to receive and process the frame. As discussed above, because a broadcast message does not necessitate an ACK response, receiving a broadcast signal has low impact on the primary radio. Therefore, the Thread radio does not wait for a response from the primary radio before receiving and processing the signal.

Alternatively, if the frame is not a broadcast frame (625-N), then a determination is made as to whether too many requests have already been made within the current window. Thus, in step 640, the timer is paused and the total count is incremented. Then, the process explores whether a grant can be requested under the first scenario.

Specifically, in step 645, the process checks whether any WaitForGrant-type requests are remaining (e.g., WaitCount>0). According to aspects of the disclosure, the WaitCount is set to a predetermined positive integer that corresponds to an upper limit for requests of that type within each window. If some of these types of requests remain (645-Y), then the WaitCount is decremented and the thread radio requests a reception grant from the primary radio at 650. The thread radio waits to receive the grant from the primary radio, and then upon receipt of the grant, receives and processes the received frame. The thread radio also transmits a grant to the source of the received frame.

Alternatively, if there are no WaitForGrant-type requests remaining (645-N), then the process checks whether any high-priority grant requests (i.e., DoNotWaitForGrant requests) remain 646. If at least one high-priority grant remains (646-Y), the DoNotWaitCount is decremented and the thread radio requests the grant from the primary radio at 660. Without waiting for the explicit grant, the Thread radio then receives and processes the frame and transmits the ACK.

Alternatively, if there are no high-priority grant requests remaining (e.g., 646-N), then the received frame is ignored and not processed 670. In any of these scenarios, the count that was incremented in step 640 is compared against the count threshold (TotalCount) 675 to determine whether a maximum number of frames have been received within the current window. If the count has not reached the maximum (675-N), then the method returns to step 620, where the timer is unpaused and the process substantially repeats for a newly-received frame. On the other hand, if the count has reached the maximum (675-Y), then the process resets by returning to initializing the variables in step 610. Additionally, throughout the process, the timer for the current window is monitored 685. If at any time, the timer for the current window expires, then the process resets to step 610.

To summarize the above, for each window (e.g., a predetermined duration of time), there is set a maximum number of frames that can be received, as well as a maximum number of standard receptions and high-priority receptions that can be processed. For each received packet/frame, the process checks whether the maximum number of grants have been requested for each of the standard and high-priority receptions sequentially. The process then proceeds according to whichever is available and drops the frame if neither is available. This repeats throughout the duration of the window until either the timer expires or until there is no count remaining.

Additionally, the process can be modified by the state of the primary receiver. For example, a determination is made regarding there are any WiFi (or Bluetooth or other primary radio) triggering events 695. This can be when the primary radio is experiencing RSSI drops, low data rate, or undergoing recovery, among others. As a result of this determination (695-Y), then the initialization parameters are selected/modified at 690. As a result of this additional input, the initialization parameters can be reduced or increased to allow for more or fewer grants. For example, according to aspects of the disclosure, the value of TotalCount can be initialized to a lower value than under normal operation.

Figure 7:
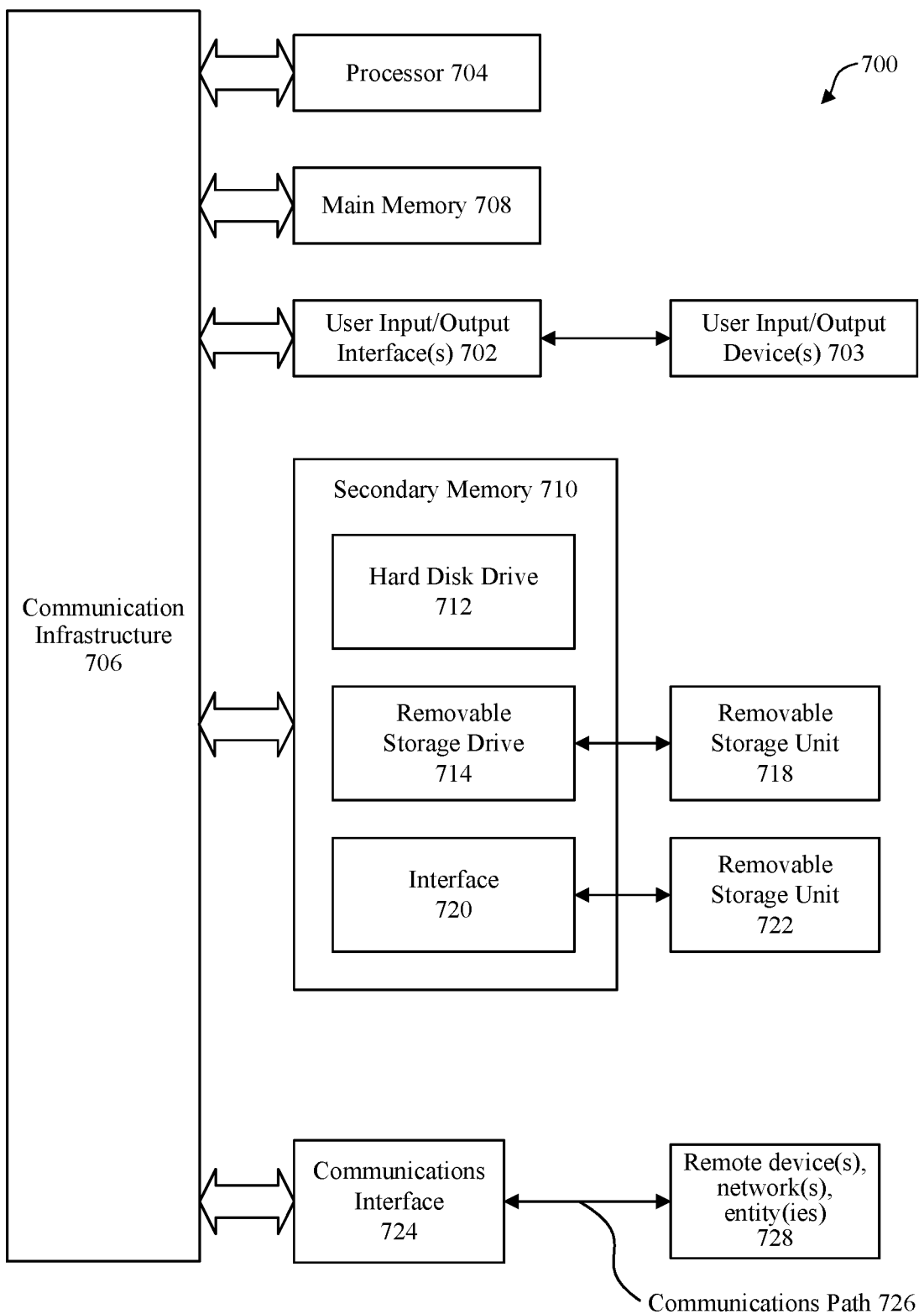
FIG. 7 illustrates an example computer system for implementing some aspects of the disclosure or portion(s) thereof.

Various aspects may be implemented, for example, using one or more computer systems, such as computer system 700 shown in FIG. 7. Computer system 700 may be any well-known computer capable of performing the functions described herein such as the one or more end devices 102, the thread leader device 104, the one or more thread router 106, and the one or more border router 108 of FIG. 1, or 200 of FIG. 2. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A wireless device, comprising:
    a primary radio, having a primary radio driver, and configured to communicate with a network;
    a secondary radio, having a secondary radio driver, and configured to communicate with the network; and
    an inter-radio interface, coupled to the primary radio driver and the secondary radio driver, configured to provide inter-communication between the primary radio and the secondary radio,
    wherein the secondary radio driver includes one or more processors configured to:
    transmit a grant request and a grant type to the primary radio via the inter-radio interface, the grant type indicating whether the grant request is for transmission or reception;
    receive a grant message from the primary radio via the inter-radio interface that either grants or denies the grant request, wherein a grant request with a reception grant type is automatically granted by the primary radio; and
    in response to the received grant message granting the grant request, communicate with the network via the secondary radio.

2. The wireless device of claim 1, wherein the inter-radio interface is a three-wire interface.

3. The wireless device of claim 2, wherein the grant request is transmitted on a first wire of the inter-radio interface, the grant type is transmitted on a second wire of the inter-radio interface, and the grant message is received on a third wire of the inter-radio interface.

4. The wireless device of claim 3, wherein the one or more processors are further configured to receive the grant message on the third wire a predetermined amount of time after the transmitting of the grant request.

5. The wireless device of claim 1, wherein the one or more processors are further configured to receive the grant message a predetermined amount of time after the transmitting of the grant request.

6. The wireless device of claim 1, wherein the grant request is a flag or a predetermined voltage, and
    wherein the grant type is a flag or a predetermined voltage.

7. The wireless device of claim 1, wherein the one or more processors are further configured to withhold communication with the network in response to the received grant message denying the grant request.

8. A method for throttling signal transmissions by a secondary radio, the method comprising:
    sending, by the secondary radio, a grant request and a grant type to a primary radio, the grant type indicating whether the grant request is for transmission or reception;
    receiving, in response to the sending, a grant message from the primary radio that indicates whether the grant request is authorized or denied, wherein a grant request with a reception grant type is automatically granted by the primary radio; and
    communicating with a network via the secondary radio based on the received grant message.

9. The method of claim 8, wherein the grant request and the grant type are transmitted sequentially.

10. The method of claim 8, wherein the grant request and the grant type are sent on different wires.

11. The method of claim 8, wherein the grant message is received from a grant message wire a predetermined amount of time after the sending.

12. The method of claim 8, wherein each of the grant request and the grant type is a flag or a predetermined voltage.

13. A method, comprising:
   transmitting, by a secondary radio driver of a secondary radio of a wireless communication device, a grant request and a grant type to a primary radio of the wireless communication device via an inter-radio interface, the grant type indicating whether the grant request is for transmission or reception;
   receiving, by the secondary radio driver, a grant message from the primary radio via the inter-radio interface that either grants or denies the grant request, wherein a grant request with a reception grant type is automatically granted by the primary radio; and
   in response to the received grant message granting the grant request, communicating with a network via the secondary radio.

14. The method of claim 13, wherein the inter-radio interface is a three-wire interface.

15. The method of claim 14, wherein the grant request is transmitted on a first wire of the inter-radio interface, the grant type is transmitted on a second wire of the inter-radio interface, and the grant message is received on a third wire of the inter-radio interface.

16. The method of claim 15, further comprising receiving the grant message on the third wire a predetermined amount of time after the transmitting of the grant request.

17. The method of claim 13, further comprising receiving the grant message a predetermined amount of time after the transmitting of the grant request.

18. The method of claim 13, wherein the grant request is a flag or a predetermined voltage, and
   wherein the grant type is a flag or a predetermined voltage.

19. The method of claim 13, further comprising withholding communication with the network in response to the received grant message denying the grant request.

20. The method of claim 13, further comprising limiting, by the secondary radio driver, a number of grant requests within a predetermined period of time.

* * * * *